United States Patent Office 3,421,830
Patented Jan. 14, 1969

3,421,830
PROCESS AND PREPARATION FOR
COLORING WOOL
Richard Casty, Kaiser-Augst, Alfred Berger and Walter Mosimann, Basel, and Heinz Abel, Reinach, Basel-Land, Switzerland, assignors to Ciba Limited, Basel, Switzerland, a company of Switzerland
No Drawing. Filed Jan. 31, 1964, Ser. No. 341,786
Claims priority, application Switzerland, Feb. 8, 1963, 1,566/63
U.S. Cl. 8—43                               5 Claims
Int. Cl. D06p 3/16

ABSTRACT OF THE DISCLOSURE

A process for dyeing wool with difficultly soluble dyestuffs is disclosed which consists of treating the wool with an aqueous preparation containing the dyestuff, a coacervating agent, an at most dibasic organic acid and, if desired, a thickening agent, and thereafter subjecting the treated material to moist heat without intermediate drying.

---

It has been found that wool can be colored, i.e. dyed or printed, in an advantageous manner when dyestuffs that are sparingly soluble in an acid aqueous medium together with a coacervating substance and, if desired, a solution promoter are pasted, and this preparation is applied in a continuous manner to the material to be dyed in the presence of a suitable thickener, a lower organic monocarboxylic or dicarboxylic acid and, if desired, a metal donor, whereupon the material is subjected without prior intermediate drying to a moist heat treatment.

According to the invention there is first prepared a dye paste containing a suitable dyestuff, a coacervating substance and a solution promoter.

Those dyestuffs are suitable which are sparingly soluble in an acid aqueous medium, that is to say, for example, are precipitated in a finely dispersed form when their alkaline solution is neutralized or acidified. For the present purpose there are especially suitable certain azo dyestuffs, more especially those which are formed when a diazo compound of 1-amino-2-hydroxy-naphthalene-5-sulfonic acid or 1-amino-2-hydroxy-6-nitronaphthalene-4-sulfonic acid is coupled with 1-hydroxynaphthalene or 2-hydroxynaphthalene. These dyestuffs can be converted on the fiber into metal complex dyestuffs by subsequent metallization with a suitable metal donor. It has proved advantageous to precipitate the dyestuffs from the alkaline coupling solution, then to express the aqueous solution extensively and to process the moist pressed cake further. Alternatively, there may be used previously metallized dyestuffs that are sparingly soluble in an acid aqueous medium.

When the dyestuffs are metallized only on the fiber, a metal donor must be added to the dye preparation. For this purpose there are particularly suitable salts of chromium or cobalt, especially the fluorides, oxalates and acetates of trivalent chromium or cobalt respectively.

As coacervating substances for the present purpose there are to be understood compounds capable of forming with water, or with water containing additives a liquid two-phase system with miscibility gap.

The term "coacervation" refers to the demixing of a colloidal solution of a hydrophilic colloid to form two liquid phases, the phase richer in solids being called the coacervate and the phase poorer in solids being called the equilibrium liquid. The coacervate is characterized by the fact that it contains a relatively large amount of water in a small amount of colloid. Accordingly, the resulting two-phase systems contain water as the only solvent.

Such coacervating compounds may have a widely differing chemical structure. Thus, for example, there may be used compounds of the formula

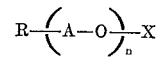

where R represents a hydrophobising radical, A an alkylene radical with 2 to 4 carbon atoms, and X a hydrogen atom or an acid atomic grouping capable of imparting solubility in water, and $n$ is a number from 1 to 20. Particularly good results have been obtained with those relevant compounds which correspond to the formula

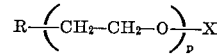

where R and X have the above meaning and $p$ is a number from 1 to 12. Special mention in this connection deserves the group of compounds of the formula

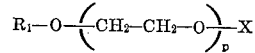

where $p$ and X have the above meanings and $R_1$ represents an aliphatic, cycloaliphatic or aliphatic-aromatic radical, preferably a hydrocarbon radical with 10 to 22 carbon atoms. Such radicals are derived from alcohols, such as lauryl, tridecyl, oleyl, octadecyl or hydroabiethyl alcohol, from carboxylic acids such as lauric acid or coconut oil fatty acid, and especially from alkyl-phenols such as octylphenol or nonylphenol. Alternatively, instead of the said hydroxyl compounds the corresponding thio compounds may be used. Among these compounds those are particularly valuable which are soluble in water and contain 1 to 6 molecular proportions of ethylene oxide.

These assistants are obtained when the aforementioned alcohols, acids or alkylphenols are reacted with 1 to 12 mols of ethylene oxide and the resulting product is etherified with a halocarboxylic or hydroxycarboxylic acid, for example with chloroacetic acid; or is converted into an acid ester with the aid of an organic dicarboxylic acid such as maleic, malonic or succinic acid, or preferably with an inorganic polybasc acid, such as ortho-phosphoric acid or especially sulfuric acid.

Accordingly, there are especially suitable for use in the present process compounds of the formula

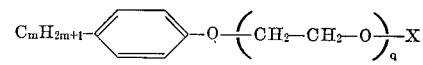

where $m$ is a whole number, at least 7, $q$ is a number from 1 to 8, preferably from 1 to 6, and X represents a hydrogen atom or an acid water-solubilizing atomic grouping, preferably the radical of a polybasic inorganic acid. It is also possible to use mixtures of assistants of the above formulae, especially those in which the

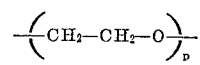

radicals are non-uniform so that the mean value of $p$ no longer represents a whole number, and may be, for example, about 1.5. It is of special advantage to use for the manufacture of the aqueous preparations, instead of the acid ethers or esters, their alkali metal, ammonium or amine salts.

The amount of coacervating substance required may vary within very wide limits, for example from 10 to 80 parts, advantageously 15 to 50 parts, for every 100 parts of dyestuff paste. In manufacturing the dyestuff paste to be used in the present process there may be further added a solution promoter, that is to say, as is commonly known, a substance that renders compounds that are practically insoluble in a certain solvent soluble in that particular solvent. As such compounds there are preferably used in the present process derivatives of ethyleneglycol. Particularly suitable for this purpose are polyethyleneglycols of widely varying molecular weights and monomeric glycols etherified with lower alcohols (for example those containing 1 to 4 carbon atoms), more especially ethyleneglycol monoethyl ether.

The amount of solution promoter to be used may vary within wide limits, namely from 10 to 30, preferably from 15 to 25, parts per 100 parts of dye paste.

When the afore-mentioned dyestuffs, coacervating substances and solution promoters are intimately mixed, for example in an efficient stirrer or in a color mill, a very fine dye paste is obtained which is excellently suitable for further processing according to this invention.

The afore-mentioned dye paste is generally mixed with a thickener which is stable in an acid medium and is not destroyed by the presence of a metal donor. Such thickeners are, for example, British gum or etherified carubic acids. They are added in the amounts conventionally employed in padding or in slub printing, that is to say 2 to 200 parts of thickener (referred to the dry substance) are added to every 1000 parts of dye preparation.

Most of the organic monocarboxylic and dicarboxylic acids to be used in the present process belong to aliphatic series, and their aliphatic chain should contain at most 4 carbon atoms apart from the carboxyl carbon atoms. Accordingly, there are suitable in the series of dicarboxylic acids from oxalic acid to adipic acid all dicarboxylic acids, including their hydroxy derivatives, for example malic acid or tartaric acid. Particularly valuable, however, are the lower aliphatic monocarboxylic acids, for example formic acid and acetic acid. The amount of acid required varies from 5 to 50 parts for every 1000 parts of dye preparation.

According to the invention there must further be added a metal donor depending on the type of dyestuff used. It goes without saying that the metal donor added must be capable of forming complexes with the dyestuff. Inter alia, there are suitable above all the salts of trivalent chromium or cobalt, especially the salts with salicylic, oxalic, acetic and hydrofluoric acid. It has proved advantageous to add the metal donor in an amount constituting 1 to 5% of the weight of the dye paste.

According to the invention the aqueous dye preparation is applied to the material to be dyed in a continuous manner, for example to washed or unwashed loose wool, to wool fabrics or to wool slubbing, by the conventional method, for example by impregnating the material on a padder and then squeezing it, or—in the case of slubbing—it is printed all over or in stripes on a slub printing machine.

Following upon the impregnation or printing the material is subjected to a moist heat treatment without intermediate drying. In general, the material is introduced into the steam chamber or fixing chamber in the wet state. The term "saturated steam" as used hereinafter refers to a type of steam that has been superheated directly or by the supply of hot air only so much that the impregnated dyed material is raised to the desired steaming temperature, without substantial formation of condensate on the one hand and without partial drying on the other hand, and is then kept in an atmosphere of saturated steam. The moist heat treatment may be performed with:

(a) Saturated steam under atmospheric pressure, either 10 to 60 minutes, for example in a Mather Platt ager or another continuous steamer, in a J-box or on a pad roll machine, or for a longer period in a cottage steamer. This steaming method is especially advantageous when the dyestuff is intended to enter a complex bond with the heavy metal only during steaming.

(b) Saturated steam of a higher temperature, for example for 3 minutes at 120° C. in a pressure steamer.

(c) Moist heat below 100° C., for example of 60° C.; the material is for instance impregnated on a padder, reeled, then wrapped airtight in a rubber blanket and kept in this state for 12 hours in a room heated at 80° C.

Following upon the steam treatment it is advantageous to clean the material in order to remove any excess dyestuff, thickener and/or assistant(s). As a rule, this cleaning is carried out in a warm bath to which a surface-active detergent and/or alkalies may be added. When wool slubbing, for example, is to be dyed these wet treatments may be performed with advantage on a back-washing machine.

When unwashed raw wool, so-called wool in the grease, or unwashed woolen piece goods, so-called loom-state goods, are to be dyed by this method, the grease drops into the warm alkaline washing bath so that it is possible to wash and dye in a single operation.

Compared with other processes the present process offers several advantages; thus, for example, compared with a process using the dry dyestuff, which in the preparation of the acid impregnating liquor can be precipitated again, substantial improvements with respect to levelness can be achieved. The use of the moist press cake further makes it possible to use a crude product as obtained in the manufacture. This eliminates the need of a drying and grinding process from the manufacture and from the application procedure the time-consuming dissolution and possibly reprecipitation of the dyestuff. Since the present process also makes available to the dyer a dye paste which as such merely needs mixing with the blank printing paste without application of heat, the present process constitutes a considerable simplification since the dyer no longer needs to carry out time-consuming dissolution operations with the dyestuff and can thus also dispense with the delicate reprecipitation of the dyestuff which occurs when some dyestuffs are acidified.

Unless otherwise indicated, parts and percentages in the above description and following examples are by weight.

EXAMPLE 1

A dye preparation is manufactured from 45 parts of the moist press cake obtained by making the coupling product from the diazonium compound of 1-amino-2-hydroxy-6-nitronaphthalene-4-sulfonic acid and 2-hydroxynaphthalene, 35 parts of a 44% solution of the ammonium salt of the acid sulfuric acid ester of an adduct of 2 mols of ethylene oxide with 1 mol of para-tertiary nonylphenol, and 20 parts of a 50% aqueous solution of ethyleneglycol monoethyl ether.

From the above dye preparation a padding liquor is made by stirring 200 parts of the dye preparation described above with 15 parts of a commercial thickener from highly etherified carubic acids and adding 730 parts of water, 30 parts of chromic fluoride ($CrF_3 \cdot 4H_2O$) and 25 parts of 85% formic acid.

When the thickener has completely dissolved, the resulting padding liquor is used to pad loose wool, which is then steamed in a room filled with saturated steam at 102° C. A deep black dyeing is obtained which is finished off by washing at 50° C. followed by drying.

Similar good results are obtained when ethyleneglycol monoethyl ether is replaced by polyethyleneglycol of molecular weight 300 or by a corresponding amount of plain water.

When the ammonium salt of the acid sulfuric acid ester of an adduct of 2 mols of ethylene oxide with 1 mol of para-tertiary nonylphenol is replaced by 10 to 20 parts of an adduct of 5 to 6 mols of ethylene oxide with 1 mol of para-nonylphenol, similar good results are likewise obtained. Instead of the acid sulfuric acid ester there may be used 20 parts of an adduct of 6 mols of ethylene oxide with 1 mol of tertiary dodecylmercaptan diluted with 15 parts of water.

Similar results are obtained when instead of loose wool, wool in the form of slubbing, yarn or piece goods is treated in the manner described above.

When, instead of being steamed, woolen or worsted piece goods are wrapped in a plastic foil and thus stored for 15 hours at 80° C., similar good results are obtained when the material is finished off as described above.

Instead of the coupling product of the diazonium compound of 1-amino-2-hydroxy-6-nitronaphthalene-4-sulfonic acid and 2-hydroxynaphthalene there may be used an equal amount of the coupling product of the diazonium compound of 1-amino-2-hydroxynaphthalene-4-sulfonic acid and 2-hydroxynaphthalene; a fast blue dyeing is then obtained.

EXAMPLE 2

A printing paste is manufactured from the dye preparation described in Example 1 by stirring 150 parts of the dye preparation
5 parts of a commercial thickener resistant to acids and heavy metal salts
765 parts of water
25 parts of chromium fluoride ($CrF_3 \cdot 4H_2O$)
25 parts of 85% formic acid
30 parts of oil of turpentine until the thickener has completely dissolved. This preparation is printed in known manner on a slub printing machine on wool slubbing which is then steamed for 60 minutes at 102° C. in a cottage steamer. The slivers are then washed in a back-washing machine and dried. A deep black print is thus obtained.

EXAMPLE 3

A dye preparation is manufactured from 45 parts of the moist press cake obtained in the manufacture of the coupling product of the diazo compound of 1-amino-2-hydroxy-6-nitronaphthalene-4-sulfonic acid and 1-hydroxynaphthalene, 35 parts of a 44% solution of the ammonium salt of the acid sulfuric acid ester of an adduct of 2 mols of ethylene oxide with 1 mol of para-tertiary nonylphenol, and 20 parts of polyethyleneglycol of molecular weight 300.

The above dye preparation is turned into a padding liquor by stirring 200 parts of the above dye preparation with 200 parts of a 5% aqueous thickening from highly etherified carubic acid and adding 545 parts of water
30 parts of chromium fluoride ($CrF_3 \cdot 4H_2O$) and
25 parts of 85% formic acid.

Wool slubbing is padded with the resulting liquor and then steamed in a room filled with saturated steam heated at 100° C. A deep black dyeing is obtained which is finished off by washing at 50° C. followed by drying.

EXAMPLE 4

A dye preparation is manufactured from 35 parts of the press cake used in Example 1, 45 parts of a 44% solution of the ammonium salt of the acid sulfuric acid ester of an adduct of 2 mols of ethylene oxide with 1 mol of para-tertiary nonylphenol, and 20 parts of polyethyleneglycol of molecular weight 300.

A padding liquor is then manufactured from 100 parts of the dye preparation described above
250 parts of a 5% aqueous thickening from highly etherified carubic acids
610 parts of water
20 parts of chromium fluoride ($CrF_3 \cdot 4H_2O$) and
20 parts of oxalic acid.

Wool slubbing is padded with this liquor and then steamed for 45 minutes at 100° C. A black dyeing is obtained which is fast to washing.

EXAMPLE 5

A dye preparation is manufactured from 45 parts of the press cake used in Example 1 and 20 parts of the ammonium salt of the acid sulfuric acid ester of an adduct of 4 mols of ethylene oxide with 1 mol of hydroabiethyl alcohol.

A padding liquor is then manufactured from 200 parts of the dye preparation described above
250 parts of a 5% aqueous thickening from highly etherified carubic acids
495 parts of water
30 parts of chromium fluoride ($CrF_3 \cdot 4H_2O$)
25 parts of 85% formic acid.

When wool slubbing is padded with this liquor as described in Example 3, steamed and finished off, a deep black dyeing is obtained.

Similar results are obtained when in the dye preparation the 20 parts of the ammonium salt of the acid sulfuric ester of an adduct of 4 mols of ethylene oxide with 1 mol of hydroabiethyl alcohol are replaced by 35 parts of a 50% solution of the ammonium salt of the acid sulfuric acid ester of coconut oil fatty acid diethyleneglycol ester.

EXAMPLE 6

A dye preparation is manufactured from 30 parts of the moist press cake of the dyestuff, precipitated from an acid medium, of the formula

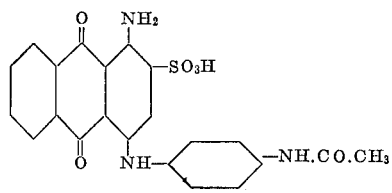

45 parts of a 42% solution of the ammonium salt of the acid sulfuric acid ester of lauryl sorbitan ester, and 25 parts of polyethyleneglycol of molecular weight 300.

A padding liquor is then manufactured from 100 parts of the dye preparation described above
250 parts of a 5% aqueous thickening from highly etherified carubic acids
640 parts of water and
10 parts of 80% acetic acid.

Wool slubbing is padded with this liquor and then steamed for 30 minutes at 100° C. A deep blue dyeing is obtained which is finished off by washing at 40° C. followed by drying.

EXAMPLE 7

A dye preparation is manufactured from 40 parts of the complex dyestuff which contains for every atom of chromium 2 molecules of the dyestuff obtained by diazotizing a mixture of 2-amino-4-nitrophenol and 2-amino-5-nitrophenol and coupling with 2-naphthol, which are pasted with
10 parts of water, together with a dispersant, and there are then added:
30 parts of a 44% solution of the ammonium salt of the acid sulfuric acid ester of an adduct of 2 mols of ethylene oxide with 1 mol of para-tertiary nonylphenol, and
20 parts of polyethyleneglycol of molecular weight 300.

A padding liquor of the following composition is then made:

200 parts of the dye preparation described above
250 parts of a 5% aqueous thickening from highly etherified carubic acids
540 parts of water, and
10 parts of 80% acetic acid.

When wool slubbing is padded with this liquor as described in Example 1 and then steamed and finished off, a deep black dyeing is obtained.

EXAMPLE 8

A padding liquor is manufactured from 200 parts of the dye preparation described in Example 1
12 parts of a commercial thickener resistant to acids and heavy metal salts
678 parts of water
10 parts of potassium bichromate, and
100 parts of 85% formic acid.

When wool slubbing is padded with this liquor and then steamed and finished off as described in Example 1, a deep black dyeing is obtained.

What is claimed is:

1. Process for coloring wool with dyestuffs that are difficultly soluble in an acid aqueous medium, which process comprises contacting the material to be colored with an aqueous preparation containing a dyestuff selected from the group consisting of a coupling product from diazotized 1 - amino-2-hydroxynaphthalene-4-sulfonic acid with 1-hydroxynaphthalene, diazotized 1 - amino - 2 - hydroxynaphthalene-4-sulfonic acid with 2-hydroxynaphthalene, 1-amino-2-hydroxy-6-nitronaphthalene - 4 - sulfonic acid with 1-hydroxynaphthalene, and 1-amino-2-hydroxy-6-nitronaphthalene-4-sulfonic acid with 2-hydroxynaphthalene, an acid-stable, water-soluble coacervating agent, an acid-stable thickening agent, an aliphatic monobasic acid containing 1 to 4 carbon atoms in an amount of 5 to 85 parts for every one thousand parts of dye preparation, a solution promoter, and a metal donor; and then subjecting the material so treated to a moist heat-treatment without previous intermediate drying.

2. Process for coloring wool with dyestuffs that are difficultly soluble in an acid aqueous medium, which process comprises contacting the material to be colored with an aqueous preparation containing the coupling product from diazotized 1-amino-2-hydroxynaphthalene-4-sulfonic acid with 1-hydroxynaphthalene, a water-soluble compound of a reaction product of an alkyl phenol with 1 to 8 mols of ethylene oxide, a thickening agent from etherified carubic acids, an aliphatic monocarboxylic acid containing 1 to 4 carbon atoms in an amount of 5 to 85 parts for every one thousand parts of dye preparation, a polyethylene glycol and chromium fluoride; and then subjecting the material so treated to a moist heat-treatment without previous intermediate drying.

3. Process for coloring wool with dyestuffs that are difficultly soluble in an acid aqueous medium, which process comprises contacting the material to be colored with an aqueous preparation containing the coupling product from diazotized 1-amino-2-hydroxy-6-nitronaphthalene-4-sulfonic acid with 1-hydroxynaphthalene, a water-soluble compound of a reactive product of an alkyl phenol with 1 to 8 mols of ethylene oxide, a thickening agent from etherified carubic acids, formic acid in an amount of 5 to 85 parts for every one thousand parts of dye preparation, and chromium fluoride; and then subjecting the material so treated to a moist heat-treatment without previous intermediate drying.

4. Process for coloring wool with dyestuffs that are difficultly soluble in an acid aqueous medium, which process comprises contacting the material to be colored with an aqueous preparation containing the coupling product from diazotized 1-amino-2-hydroxynaphthalene-4-sulfonic acid with 2-hydroxynaphthalene, a water-soluble compound of a reaction product of an alkyl phenol with 1 to 8 mols of ethylene oxide, a thickening agent from etherified carubic acids, an aliphatic monocarboxylic acid containing 1 to 4 carbon atoms in an amount of 5 to 85 parts for every one thousand parts of dye preparation, a polyethylene glycol and chromium fluoride; and then subjecting the materials so treated to a moist heat-treatment without previous intermediate drying.

5. Process for coloring wool with dyestuffs that are difficultly soluble in an acid aqueous medium, which process comprises contacting the material to be colored with an aqueous preparation containing the coupling product from diazotized 1 - amino-2-hydroxy-6-nitronaphthalene-4-sulfonic acid with 2-hydroxynapthalene, a water-soluble compound of a reaction product of an alkyl phenol with 1 to 8 mols of ethylene oxide, a thickening agent from etherified carubic acids, formic acid in an amount of 5 to 85 parts for every one thousand parts of dye preparation, and chromium fluoride; and then subjecting the material so treated to a moist heat-treatment without previous intermediate drying.

References Cited

UNITED STATES PATENTS

| 3,056,644 | 10/1962 | Radley et al. | 8—93 |
| 3,211,514 | 10/1965 | Casty et al. | 8—43 X |

FOREIGN PATENTS

| 1,301,494 | 7/1962 | France. |

NORMAN G. TORCHIN, *Primary Examiner.*

T. J. HERBERT, JR., *Assistant Examiner.*

U.S. Cl. X.R.

8—54, 82, 93